United States Patent [15] 3,690,596
Durran et al. [45] Sept. 12, 1972

[54] SPIN CONTROL SYSTEM FOR REENTRY VEHICLE
[72] Inventors: Donald A. Durran, Manhattan Beach; Daniel H. Platus, Playa Del Rey, both of Calif.
[73] Assignee: The United States of America as represented by the Secretary of the United States Air Force
[22] Filed: May 2, 1969
[21] Appl. No.: 823,247

[52] U.S. Cl..............................244/3.21, 244/3.23
[51] Int. Cl................................F42b 15/14
[58] Field of Search.....................244/3.21, 3.23

[56] References Cited
UNITED STATES PATENTS
3,260,205   7/1966   Dietrich..................244/3.23

Primary Examiner—Verlin R. Pendegrass
Attorney—Harry A. Herbert, Jr. and Richard J. Killoren

[57] ABSTRACT

A spin control system for a reentry vehicle has a plurality of fins located around the periphery of the vehicle. The fins are rotated by a mass which moves under the action of centrifugal force to move a pair of pins in cam slots located on the fin support shafts to thereby rotate the fins to decrease the cant angle from a preset value at zero roll.

2 Claims, 5 Drawing Figures

PATENTED SEP 12 1972  3,690,596
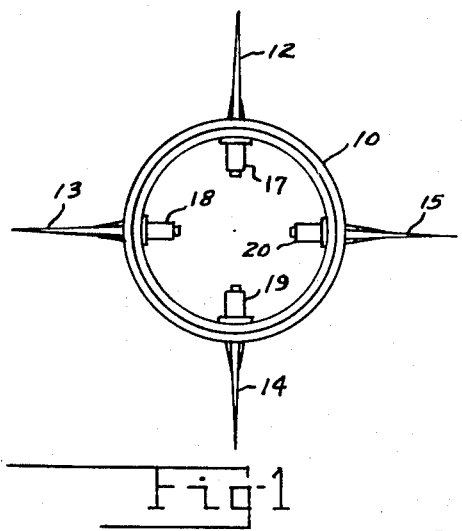
Fig-1
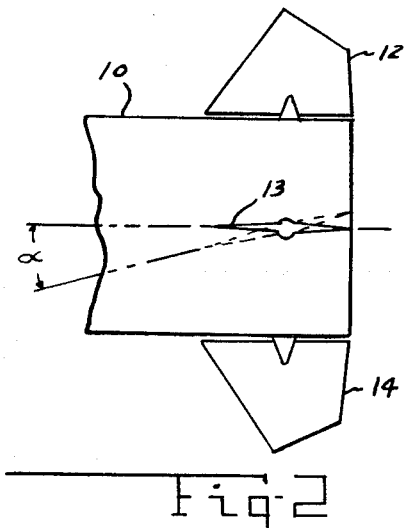
Fig-2
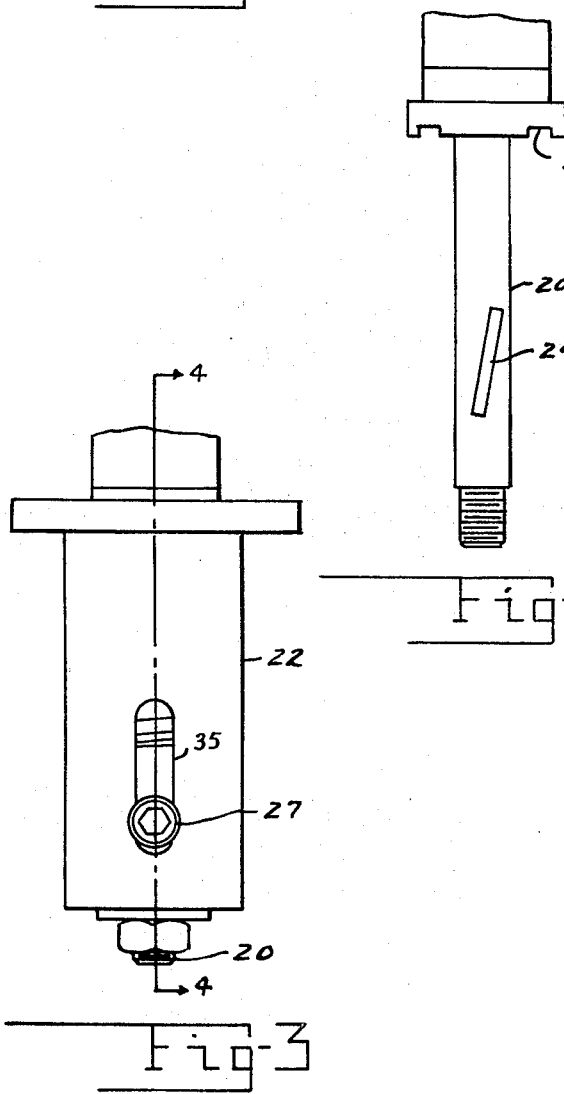
Fig-3
Fig-5
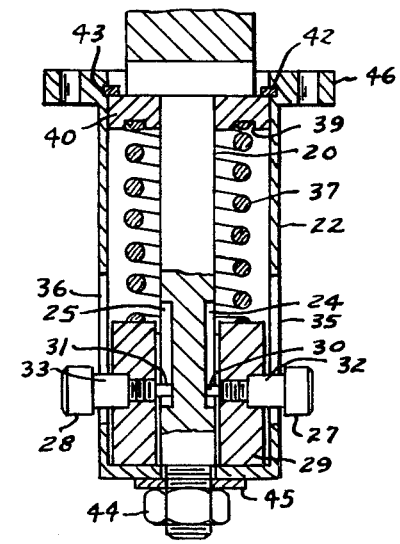
Fig-4
INVENTORS
DONALD A. DURRAN
DANIEL H. PLATUS
BY Harry A. Herbert Jr.
ATTORNEY
Richard J. Killore
AGENT

SPIN CONTROL SYSTEM FOR REENTRY VEHICLE

BACKGROUND OF THE INVENTION

During flight tests of small reentry vehicles, large excursions have been observed in the vehicle roll rate, most probably due to the development of configurational asymmetries during ablation of the nose tip and heat shield. These are slender vehicles with small roll movements of inertia, so that relatively small asymmetries can produce appreciable roll accelerations, especially when the vehicle is in the vicinity of peak dynamic pressure. The resulting roll rates can reach sufficient magnitudes for the vehicle to lock into roll resonance, with potentially detrimental effects on the vehicle motion, trajectory, and structural integrity.

If the roll rate passes through zero when an aerodynamic trim is present, and appreciable range error can result, depending on the magnitude of the trim and the altitude at which the roll rate passes through zero.

A means of avoiding resonance that does preclude a zero roll rate is a system that maintains the roll rate at some safe margin above the critical roll rate by intentionally overspinning the vehicle. Overspinning can be achieved passively by means of small canted fins or grooves designed to spin up the vehicle aerodynamically and to terminate the roll acceleration at some prescribed roll rate above critical.

Certain design problems are associated with fixed fins and grooves for aerodynamic overspinning of reentry vehicles. The problems associated with fixed fins or grooves arise from the small cant angles required which place stringent requirements on design tolerances. There is also the question of whether the desired roll moments can be achieved with small cant angles, particularly at higher altitudes with thick laminar boundary layers.

SUMMARY OF THE INVENTION

According to this invention, variable cant angle fins are employed, wherein the cant angles are passively regulated by centrifugal forces accompanying an increase in roll rate. The fins cant angles decrease from an initial fixed angle at zero roll to a terminal value at some prescribed value of roll. Any increase or decrease in roll rate from the prescribed value due to extraneous forces drives the fins in a positive or negative direction depending upon the effects of the extraneous forces on roll and thus tends to return the roll rate back to its designed terminal value. Thus, the fins actuator systems maintain a substantially constant terminal roll rate by acting as a form of governor.

BRIEF DESCRIPTION OF THE DRAWING

FIG. 1 is an end view of a vehicle with variable control fins according to the invention;

FIG. 2 is a partially cutaway side view of the device of FIG. 1;

FIG. 3 is a side view of the fin actuator assembly for the device of FIG. 1;

FIG. 4 is a sectional view of the device of FIG. 3 along the line 4—4, and

FIG. 5 shows the fin support shaft of FIGS. 3 and 4 rotated 90° with respect to the showing in FIG. 4.

DESCRIPTION OF THE PREFERRED EMBODIMENT

Referring now to FIG. 1 of the drawing, reference numeral 10 shows a reentry vehicle having four guide fins 12, 13, 14, and 15. With zero roll the fins are positioned at a cant angle $\alpha$ as shown in FIG. 2. The cant angles, of the fins, are controlled by passive fin actuators 17, 18, 19, and 20.

As shown in FIGS. 3 and 4, each of the fins has a fin support shaft 20 which is rotatable within a housing 22. The shaft 20 has a pair of cam slots 24 and 25, one of which is shown in greater detail in FIG. 5. A pair of cam follower screws 27 and 28 are secured to an actuating mass 29, and have projections 30 and 31 extending into the cam slots 24 and 25, respectively. The follower screws 27 and 28 also have shoulder portions 32 and 33 which ride in guide slots 35 and 36. A spring 37 is positioned around shaft 20 between the actuating mass 29 and a slot 39 in a flange member 40 on shaft 20. A snap spring 42 locks into a groove 43 in the housing 22 and works against flange member 40 to retain the shaft within housing 22 against the force of spring 37. A washer 45 and nut 44 retain the shaft within the housing and may be used for adjusting spring 37. The device is mounted on the vehicle by means of flange 46.

In the operation of the device, the fins are positioned at the fin cant angle $\alpha$ at zero roll rate by proper positioning of cam slots 24 and 25 with respect to slots 35 and 36. When the vehicle is accelerated in forward flight, aerodynamic forces on the canted fins cause the vehicle to spin at an increasing rate. The centrifugal force on the masses inside the housings 22 acts against springs 37 to move the masses outwardly within the housings. As the masses move, the cam foller screws 27 and 28 move in guide slots 35 and 36 so that projections 30 and 31 move in the cam slots 24 and 25 to rotate fin support shafts 20 and the fins 12, 13, 14, and 15 to decrease the cant angles of the fins. The masses 29 continue to change the cant angles of the fins 12, 13, 14, and 15 until the final design condition for maximum roll rate is reached. A further increase or a decrease from this condition causes movement of the masses 29 to correct the roll and to return it to the desired design roll rate.

While the use of the fins has been described with respect to a reentry vehicle, the fins could also be used with other aerodynamic vehicles such as ballistic missiles.

There is thus provided a passive device for spinning up a vehicle to a desired maximum roll rate and to maintain the roll rate at substantially the desired value.

We claim;

1. A spin control system for an aerodynamic vehicle for spinning the vehicle to a desired maximum roll rate, comprising a plurality of rotatable fins positioned around the periphery of said vehicle; said fins being positioned at a predetermined cant angle at zero roll of said vehicle; a fin support shaft, on each of said fins; an actuating mass member surrounding a portion of each of said support shafts; means for biasing said actuating mass members in a direction inwardly of said vehicle; means, attached to said actuating mass members, for rotating said shafts and said fins in response to centrifugal force acting on said mass members to decrease the cant angles with an increase in roll of said vehicle.

2. The device as recited in claim 1 including a housing surrounding each of said fin support shafts; said means, for rotating said shafts and said fins, including a pair of cam slots positioned on each of said support shafts; a pair of pins secured to each of said masses and engaging said cam slots and a pair of pin guide slots positioned in each of said housings.

* * * * *